(12) United States Patent
Yu et al.

(10) Patent No.: US 12,508,108 B2
(45) Date of Patent: Dec. 30, 2025

(54) AXIAL DIRECTION AND DEPTH CHECKING GUIDE PLATE FOR IMPLANTING AND MANUFACTURE METHOD THEREOF

(71) Applicant: SICHUAN UNIVERSITY, Sichuan (CN)

(72) Inventors: Haiyang Yu, Sichuan (CN); Chenyang Xie, Sichuan (CN); Tinglu Fang, Sichuan (CN); Yingkai Wang, Sichuan (CN)

(73) Assignee: SICHUAN UNIVERSITY, Chengdu (CN)

( * ) Notice: Subject to any disclaimer, the term of this patent is extended or adjusted under 35 U.S.C. 154(b) by 413 days.

(21) Appl. No.: 18/039,293

(22) PCT Filed: Nov. 29, 2021

(86) PCT No.: PCT/CN2021/133859
§ 371 (c)(1),
(2) Date: May 30, 2023

(87) PCT Pub. No.: WO2022/116929
PCT Pub. Date: Jun. 9, 2022

(65) Prior Publication Data
US 2024/0000551 A1    Jan. 4, 2024

(30) Foreign Application Priority Data
Dec. 2, 2020 (CN) .......................... 202011389147.6

(51) Int. Cl.
*A61C 8/00* (2006.01)
*G06T 7/00* (2017.01)

(52) U.S. Cl.
CPC ............ *A61C 8/009* (2013.01); *A61C 8/0037* (2013.01); *G06T 7/0012* (2013.01); *G06T 2207/10081* (2013.01)

(58) Field of Classification Search
CPC ......... B33Y 10/00; B33Y 80/00; B33Y 50/00; A61C 8/009; A61C 8/0037; G06F 30/20; B29C 64/386
See application file for complete search history.

(56) References Cited

U.S. PATENT DOCUMENTS

| | | | | |
|---|---|---|---|---|
| 2009/0042167 A1* | 2/2009 | Van Der Zel | ........ | A61C 9/0053 433/172 |
| 2010/0003635 A1* | 1/2010 | Feith | .................... | A61C 8/0018 433/201.1 |

(Continued)

FOREIGN PATENT DOCUMENTS

| | | |
|---|---|---|
| CN | 108852498 A | 11/2018 |
| CN | 110314003 A | 10/2019 |

(Continued)

OTHER PUBLICATIONS

International Search Report of PCT Patent Application No. PCT/CN2021/133859 issued on Feb. 24, 2022.

*Primary Examiner* — Nicholas Klicos (57) ABSTRACT

The present disclosure a manufacture method of axial direction and depth checking guide plate for implanting, comprises the following steps: S1: obtaining dentition data by an optical scanner, obtaining a preoperative model; virtually arranging the teeth to obtain a virtual waxing; taking Cone Beam Computed Tomography to obtain the jaw data; S2: determining the type and specification of implant, adjusting the three-dimensional position of the implant; S3: customizing an abutment, and obtaining the abutment data and model data after fitting of the dentition data and the jaw data; S4: constructing abutment cylindrical features, deviating to (Continued)

the labial/buccal side and lingual/palatal side respectively, and constructing the offset cylindrical features again; S5: creating the indicator rod, and fitting with the labial/buccal and lingual/palatal prototype separately to obtain the definitive indicator rod data; S6: designing an occlusal plate and connecting with the indicator rod, completing design of the guide plate, and 3D printing.

20 Claims, 5 Drawing Sheets

(56) References Cited

U.S. PATENT DOCUMENTS

| 2011/0136077 | A1* | 6/2011 | De Moyer | A61C 13/0004 |
| | | | | 433/213 |
| 2012/0239364 | A1* | 9/2012 | Glor | A61C 13/0004 |
| | | | | 703/11 |
| 2015/0359479 | A1* | 12/2015 | Crandall | A61B 6/4435 |
| | | | | 433/29 |
| 2022/0183732 | A1* | 6/2022 | Hale | A61C 8/0074 |

FOREIGN PATENT DOCUMENTS

| CN | 110314004 A | 10/2019 |
| CN | 112998887 A | 6/2021 |

* cited by examiner

AXIAL DIRECTION AND DEPTH CHECKING GUIDE PLATE FOR IMPLANTING AND MANUFACTURE METHOD THEREOF

TECHNICAL FIELD

The present disclosure relates to a dental implantation technology field, in particular to an axial direction and depth checking guide plate for implanting and manufacture method thereof.

BACKGROUND

Dental implantology is to insert the dental implant into the edentulous site where the natural tooth is missing. When the firm contact has been formed between the dental implant and the bone, the realistic porcelain prosthesis is attached to the dental implant, to restore the esthetics and function.

In the previous tooth implantation technology, "free hand" guidance and simple guide plate guidance are mostly used. For "free hand" guided implantation, intra-operative judgment of the axial direction of the implant is mainly based on its relationship with the long axis of the adjacent tooth, if the adjacent tooth have problems of the tilt and torsion, it is very easy to lead to errors in intra-operative judgment, and when the edentulous area is large, the reference value of the long axis of the adjacent tooth will diminish. The axial determination of the implant in the simple guide guided implant surgery is based on the guide itself and the long axis of the adjacent teeth, although there is a relatively objective guide plate as one of the evaluation criteria, it is also susceptible to anatomical factors. Because neither the "free hand" guidance nor the simple guide plate guidance can be combined with the situation of the jaw of the operative area.

With the great development of digital technology in the field of oral implantology, implantation mode is not limited to "free hand" guidance and simple guide plate guidance, digital static guide plate and dynamic navigation are also begun to be widely used. At the same time, the "restoration-oriented" implantation concept has also become a consensus, which requires starting from the final restoration, and on this basis combining the maximum available bone to design the three-dimensional position of the implant.

The digital static surgical guide itself carries the information of the preoperative design, the surgical instruments are restricted by metal or resin tubes, and the fully guided guide plate with a dedicated carrier can limit the implant position in the tube. However, there are some problems with digital surgery: unfavorable anatomical factors in the surgical area, such as hard-bladed cortical bone, loose extraction sockets, etc., can cause the implant and the instruments to fall out of position in the guide. In addition, and the reserved gap between the guide tube and the instrument in order to ensure the smooth placement of the instrument and the sufficient entry of cooling water may also cause the instrument and implant to be unfavorably offset in the guide plate unfavorable deviations of the instruments and implants in the guide plate. In this case, continued use of the guide plate will result in an unfavorable implant position. Digital dynamic navigation technology can realize real-time simulation image examination during the operation, but the application cost is high and the operation is cumbersome.

No matter which type of guided operation is used, the axial direction and depth of the implant should be checked during the operation to avoid damage to important anatomical structures, or the occurrence of poor implant position during operation, which will affect the repair outcome.

Therefore, for most guided operation, there is no immediate and objective method to check the axial direction and depth of the implant during the operation, the preoperative design cannot be visualized intra-operatively, the deviations generated during the operation cannot be directly identified by the operator, and the ideal implant position of the preoperative design cannot be obtained.

In response to the above problems, it is necessary to improve the checking technology of the axial direction and depth of implant.

SUMMARY

The technical problems to be solved by the present disclosure are: the existing dental implant operation lacks auxiliary tools and methods for axial direction and depth checking of implant, the preoperative design cannot be visualized intra-operatively, the deviation generated during the operation cannot be directly identified by the naked eye, and the ideal implant position of preoperative design cannot be obtained.

The present disclosure is implemented by using following technical solutions:

A manufacture method of axial direction and depth checking guide plate for implanting, comprises the following steps:

S1: obtaining dentition data by means of an optical scanner, obtaining a preoperative model according to the dentition data; obtaining a virtual tooth arrangement according to the dentition data, obtaining a virtual waxing according to the virtual tooth arrangement; taking oral Cone Beam Computed Tomography to obtain jaw data;

S2: determining the type and size of an implant after matching the preoperative model, the virtual waxing and the jaw data, adjusting the three-dimensional position of the implant according to the virtual waxing and the jaw data;

S3: customizing an abutment according to the three-dimensional position of the implant in step S2, and obtaining abutment data and model data after fitting of the dentition data and the jaw data;

S4: constructing the cylindrical feature for the abutment according to the data obtained in step S3, shifting it to a labial/buccal side and a lingual/palatal side respectively, constructing the cylindrical features again, obtaining the prototype of an indicator rod;

S5: creating the indicator rod according to the prototype of the indicator rod in step S4, and fitting it with the labial/buccal and lingual/palatal prototype separately to obtain the definitive indicator rod data;

S6: designing an occlusal plate according to the model data after superimposition of the dentition data and the jaw data, and connecting it the occlusal plate with the indicator rod, completing the design of the axial direction and depth checking guide plate, and using 3D printing technology to complete the manufacturing.

The present disclosure combines preoperative data to design a checking guide plate, the checking guide plate is provided with indicator rods of axial direction and depth direction, which can perform real-time checking of the axial direction position of the implant entry, when the implant is parallel to the two indicator rods, the implant with no offset in the axial direction is checked out, and the upper surface position of the indicator rod is the depth of the drill needle entry, so as to realize the implantation axial direction and depth checking of the implant.

In one or more examples, the specific steps described in step S1 comprise: using an intraoral scanner, or using a model scanner after making an impression and pouring a gypsum plaster model to obtain dentition data of the patient, obtaining a preoperative model, importing model data into professional dental design software for virtual tooth arrangement, obtaining a virtual waxing, taking Cone Beam Computed Tomography to obtain the jaw data.

In one or more examples, the specific steps described in step S2 comprise: importing the jaw data, the preoperative model data and the virtual waxing data into the implant planning software, superimposing the preoperative model, the virtual waxing and the jaw data, selecting the implant of the proper type and size according to clinical needs, and adjusting the three-dimensional position of the implant after combining the virtual waxing and jaw data.

In one or more examples, the specific steps described in step S3 comprise: customizing a cylindrical abutment in the advanced mode with a diameter of 2.5 mm and a length of adding 1 mm on the basis of the deviation obtained in step S2, exporting the abutment and model STL data, the model and the abutment data are in the same coordinate system.

Further preferably, the specific steps described in step S4 comprise: selecting the abutment to fit a cylinder feature C1, copying the cylinder feature C1 to a global coordinate system, taking the long axis of the cylinder as the rotation axis, translating the abutment with advanced move mode, fitting a cylindrical feature C2 after translation again, copying the feature C2 to the global coordinate system, selecting centers of a base face of the two cylindrical features to create a feature plane P1, wherein the feature plane P1 bisects the cylindrical features C1 and C2, selecting two centers of upper base faces or those of the lower base faces of the two cylindrical features to create a feature line L1, passing through the center of the upper base face of the cylindrical features C1, creating a feature plane P2 perpendicular to the feature line L1, wherein the feature plane P2 bisects the cylindrical feature C1, deviating 10 mm to the labial/buccal side to form a feature plane P3, and 10 mm to the lingual/palatal side to form a feature plane P4 based on P2, forming a labial/buccal side feature line L2 by intersection of the feature plane P1 and the feature plane P3, forming a lingual/palatal side feature line L3 by intersection of the feature plane P1 and the feature plane P4, forming a feature point D1 by intersection of L2 and L1 at the labial/buccal side, forming a feature point D2 by intersection of L3 and L1 at the lingual/palatal side; taking point D1 as the base point and line L2 as the axis to create a feature cylinder C3 with a diameter of 2.5 mm and a height of 15 mm at the labial/buccal side, taking point D2 as the base point and line L3 as the axis to create a feature cylinder C4 with a diameter of 2.5 mm and a height of 15 mm at the lingual/palatal side, and converting the feature cylinders C3 and C4 into polygonal objects, that is, the polygonal objects corresponding to C3 and C4 are the prototypes of the axial direction and depth indicator rods at the labial/buccal side and the lingual/palatal side.

In one or more examples, in step S4, after constructing the offset cylindrical features, the offset cylindrical features are converted to a polygon.

The step S4 can be completed in the industrial software Geomagic Studio.

In one or more examples, the specific steps described in step S5 comprise: constructing the sketch of a circle, and then with the center of the circle as the center, constructing a square with a side length smaller than the diameter of the circle, wherein the side length is 0.1-0.4 mm smaller than the diameter of the circle, stretching the two-dimensional sketch to obtain a cuboid, and exporting the data, fitting the data to the prototype of the labial/buccal side and lingual/palatal side indicator rod obtained in step S4 respectively, and then copying the cylindrical features C3 and C4 into the angular indicator rod, taking long axis of the cylindrical features as the rotation axis, making the seamed edge of the labial/buccal side indicator rod coincide with the feature plane P3, and the seamed edge of the lingual/palatal side indicator rod coincide with the feature plane P4, completing the design of the angular indicator rods of the labial/buccal side and the lingual/palatal side.

The present disclosure converts the cylindrical prototype indicator rod into the angular indicator rod, so that the operator can observe whether the axial direction of the implant drill is parallel to the indicator rod.

The step S5 can be modeled in the industrial forward design software Solidworks, and the angular three-dimensional figure can be fitted to the prototype of the cylindrical indicator rod by "manual registration" and "global registration" in the industrial software Geomagic Studio.

In one or more examples, the specific steps described in step S6 comprise: designing the occlusal plate based on the model after fitting of the dentition data and the jaw data, setting a connecting rod to connect the indicator rods at the labial/buccal side and the lingual/palatal side, completing the axial direction and depth checking guide plate, and using 3D printing technology to complete the printing of the guide plate.

An axial direction and depth checking guide plate for implanting, comprise the indicator rods, the connecting rod and the occlusal plate, wherein the connecting rod is connected to the indicator rods and the occlusal plate.

In one or more examples, the indicator rods are provided with 4 corner angles, and a camber is arranged between two adjacent corner angles.

In one or more examples, the occlusal plate is provided with a clamping groove, and the clamping groove is connected with the tooth.

Compared with the prior art, the present disclosure has the following advantages and beneficial effects:

1. The present disclosure transfers the preoperative design of implantation to the operation through the guide plate, and provides a visual reference for the axial direction and depth checking of the implant during the operation, which is conducive to the immediate detection and immediate correction of existing errors, and avoids the unfavorable effects of the delay in discovering problems on the surgical accuracy and subsequent restorative outcomes.

2. The present disclosure constructs features by digitally, accurately visualizing the preoperative design on the guide plate, thereby transferring to the mouth, the design of the parallel and angular indicator rods at the labial/buccal side and lingual/palatal side, is convenient to directly check the axial direction of the implant through the naked eye, and can also be combined with a measuring ruler for quantitative examination of the axial direction; the distance between the upper plane of the indicator rod and the neck platform of the implant is equal to the length of the selected drill needle minus the length of the implant, therefore it is also the quantifiable distance in the depth direction in the preoperative design, which can be used to judge whether the implant depth is consistent with the preoperative design in combination with the measuring ruler during the operation, so as to realize the axial direction and depth direction checking.

3. The present disclosure is applicable to the implant axial direction and depth checking of all implanting guided operation, and when used with the digital guide plate, the axial direction indicator rod can also be integrated with the surgical guide plate to reduce the error caused by relying solely on the surgical guide.

BRIEF DESCRIPTION OF DRAWINGS

The drawings described herein are intended to provide a further understanding of examples of the present disclosure, form part of the present application, and do not constitute a limitation of examples of the present disclosure. In the drawings.

DETAILED DESCRIPTION

The present disclosure is further described with examples and drawings to make the purpose, technical scheme and advantages of the present disclosure more clear. The schematic examples of the present disclosure and their descriptions are only used to explain the present disclosure, and are not used to limit the present disclosure Example 1

Figure 1:
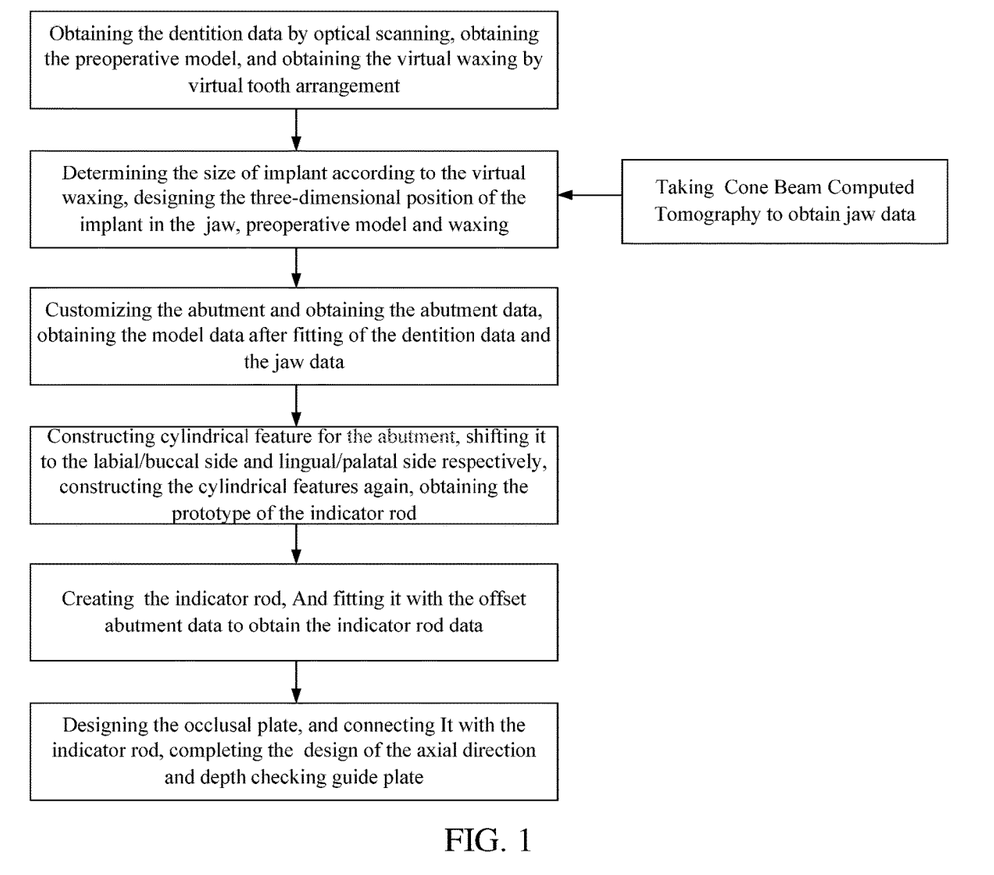
FIG. 1 is a flow chart diagram of the fabrication method of the present disclosure.
Figure 2:
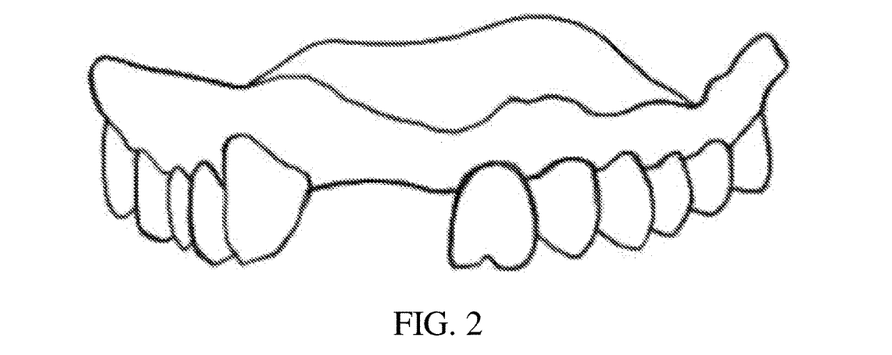
FIG. 2 is a schematic diagram of obtaining the preoperative model of the present disclosure.
Figure 3:
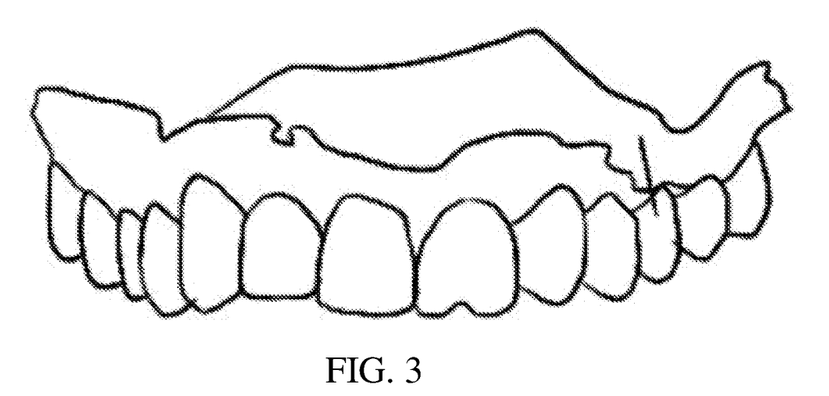
FIG. 3 is a schematic diagram of the virtual waxing of the present disclosure.

As shown in FIGS. 1 to 7, a manufacture method of axial direction and depth checking guide plate for implanting, comprises the following steps:

S1: obtaining dentition data by means of an optical scanner, obtaining a preoperative model according to the dentition data; obtaining a virtual tooth arrangement according to the dentition data, obtaining a virtual waxing according to the virtual tooth arrangement; taking an oral Cone Beam Computed Tomography to obtain jaw data;

Specifically, using the intraoral scanner, or using the model scanner after making an impression and pouring a gypsum plaster model to obtain intraoral dentition data of the patient, obtaining a preoperative model according to the dentition data, as shown in FIG. 2, importing model data into professional dental design software for virtual tooth arrangement, obtaining a virtual waxing, as shown in FIG. 3, taking Cone Beam Computed Tomography to obtain the jaw data.

Figure 4:
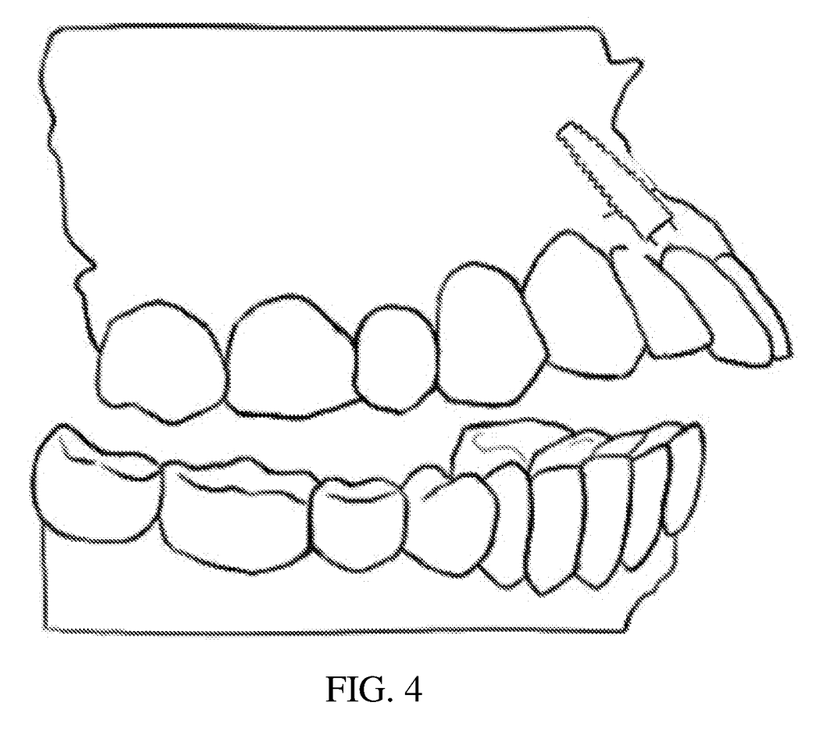
FIG. 4 is a schematic diagram of implant planning of the present disclosure.

S2: determining the type and size of an implant after matching the preoperative model, the virtual waxing and the jaw data, adjusting the three-dimensional position of the implant by combining the virtual waxing and the jaw data; importing the jaw bone DICOM data, the preoperative model and the virtual waxing data into the implant planning software, superimposing the preoperative model, the virtual waxing and the jaw data, selecting the implant of the proper type and size according to clinical needs, and adjusting the three-dimensional position of the implant according to the virtual waxing and jaw data, as shown in FIG. 4.

Figure 5:
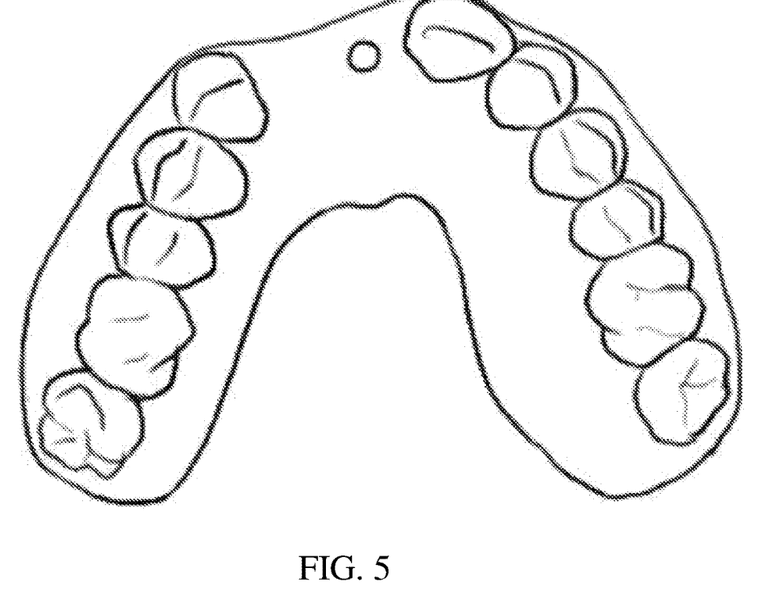
FIG. 5 is a schematic diagram of the custom abutment and model of the same coordinate system of the present disclosure.

S3: customizing an abutment according to the three-dimensional position of the implant in step S2, and obtaining abutment data and model data after fitting of the dentition data and the jaw data;

customizing a cylindrical abutment in the advanced mode with a diameter of 2.5 mm and a length of adding 1 mm on the basis of the deviation obtained in step S2, exporting the abutment and model STL data, wherein the model and the abutment data are in the same coordinate system, as shown in FIG. 5.

When adopting the implantation method guided by digital guide plate, the inter diameter of the resin guide tube, the wall thickness of the guide tube and the offset between the upper platform of the resin guide tube and the neck platform of the implant are needed to be set, taking the Straumann system as an example, when adopting the full guidance, the inner diameter of the resin guide tube is set to be 6.3 mm, the wall thickness of the guide tube is at least 1.5 mm, the offset is equal to the length of the selected drill needle minus the length of the implant, the thickness of the drill key and the thickness of the metal sleeve ring step, and the length of the drill needle can be selected 16 mm, 20 mm and 24 mm, the length of the implant can be selected 10 mm, 12 mm and 14 mm, the thickness of the drill key can be selected 1 mm and 3 mm, and the height of the metal sleeve ring step is 0.5 mm. Therefore, when selecting the implant with length of 10 mm, the drill key with thickness of 1 mm, the drill needle and the metal sleeve ring with length of 20 mm, the offset between the upper platform of the resin guide tube and the neck platform of the implant is 8.5 mm. When adopting the half guidance, the inner diameter of the resin guide tube is set to be 3.7 mm, the wall thickness of the guide tube is at least 1.5 mm, and the height of the metal sleeve ring step is 0.5 mm, the drill key is not used, so the offset is equal to the length of the selected drill needle minus the length of the implant and the thickness of the metal sleeve ring step.

Figure 6:
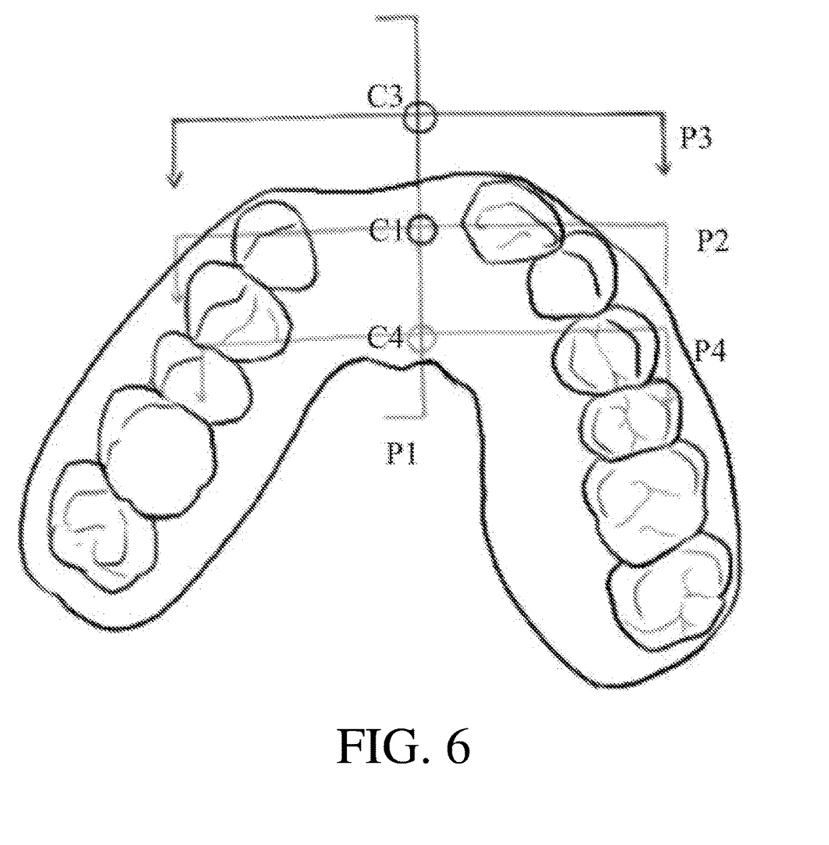
FIG. 6 is a schematic diagram of the prototype of the labial/buccal side and the lingual/palatal side indicator rods of the present disclosure.

S4: constructing the cylindrical feature for the abutment according to the data obtained in step S3, shifting it to a labial/buccal side and a lingual/palatal side respectively, constructing the cylindrical features again, obtaining the prototype of an indicator rod 2;

selecting the abutment to fit a cylinder feature C1, copying the cylinder feature C1 to a global coordinate system, taking the long axis of the cylinder as the rotation axis, translating the abutment with advanced move mode, fitting a cylindrical feature C2 after translation again, copying the feature C2 to the global coordinate system, selecting the centers of a base face of the two cylindrical features to create a feature plane P1, wherein the feature plane P1 bisects the cylindrical features C1 and C2, selecting two centers of the upper base faces or those of the lower base faces of the two cylindrical features to create a feature line L1, passing through the center of the upper base face of the cylindrical features C1, creating a feature plane P2 perpendicular to the feature line L1, wherein the feature plane P2 bisects the cylindrical feature C1, deviating 10 mm to the labial/buccal side to form a feature plane P3, and 10 mm to the lingual/palatal side to form a feature plane P4 based on P2, forming a labial/buccal side feature line L2 by intersection of the feature plane P1 and the feature plane P3, forming a lingual/palatal side feature line L3 by intersection of the feature plane P1 and the feature plane P4, forming a feature point D1 by intersection of L2 and L1 at the labial/buccal side, forming a feature point D2 by intersection of L3 and L1 at the lingual/palatal side; taking point D1 as the base point and line L2 as the axis to create a feature cylinder C3 with a diameter of 2.5 mm and a height of 15 mm at the labial/buccal side, taking point D2 as the base point and line L3 as the axis to create a feature cylinder C4 with a diameter of 2.5 mm and a height of 15 mm at the lingual/palatal side, and converting the feature cylinders C3 and C4 into polygonal objects, that is, the polygonal objects corresponding to C3 and C4 are the prototypes of the axial direction and depth indicator rods 2 at the labial/buccal side and the lingual/palatal side, as shown in FIG. 6.

The step S4 can be completed in the industrial software Geomagic Studio.

Figure 7:
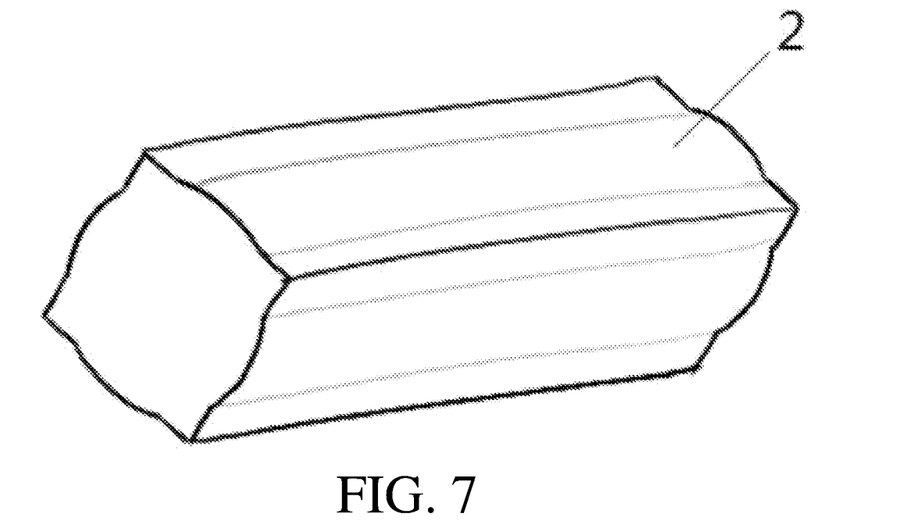
FIG. 7 is a schematic diagram of constructing the angular indicator rod of the present disclosure.

S5: creating the indicator rod 2 according to the prototype of the indicator rod 2 in step S4, and fitting it with the labial/buccal and lingual/palatal prototype separately to obtain the definitive indicator rod 2 data;

constructing the sketch of a circle with diameter of 2.5 mm, and then with the center of the circle as the center, constructing a square with side length of 2.2 mm, stretching the two-dimensional sketch to obtain the three-dimensional figure with height of 15 mm and corner angle, and exporting the STL data, as shown in FIG. 7, fitting the data to the prototype of the labial/buccal side and lingual/palatal side indicator rod 2 obtained in step S4 respectively, and then copying the cylindrical features C3 and C4 into the angular indicator rod 2, taking long axis of the cylindrical features as the rotation axis, making the seamed edge of the labial/buccal side indicator rod 2 coincide with the feature plane P3, and the seamed edge of the lingual/palatal side indicator rod 2 coincide with the feature plane P4, completing the design of the angular indicator rods 2 of the labial/buccal side and the lingual/palatal side.

The step S5 can be modeled in the industrial forward design software Solidworks, and the angular three-dimensional figure can be fitted to the prototype of the cylindrical indicator rod by "manual registration" and "global registration" in the industrial software Geomagic Studio.

Figure 8:
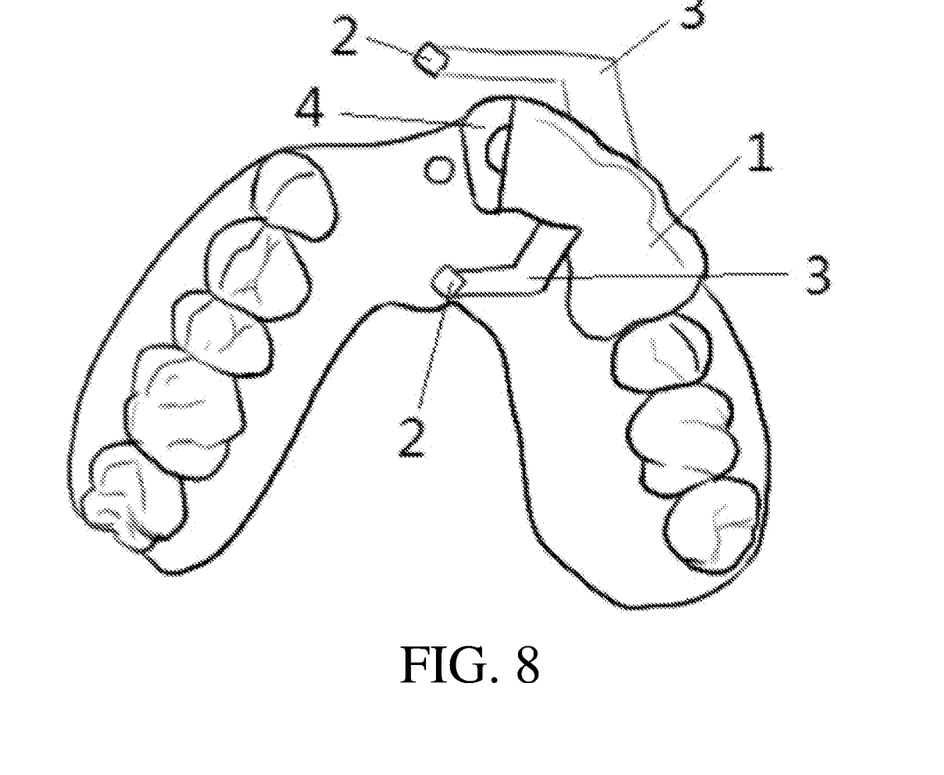
FIG. 8 is a schematic diagram of the axial and depth checking guide plate of the present disclosure.

S6: designing an occlusal plate 1 according to the model data after fitting of the dentition data and the jaw data, and connecting the occlusal plate 1 with the indicator rod 2, completing the design of the axial direction and depth checking guide plate, as shown in FIG. 8, and using 3D printing technology to complete the manufacturing.

The present disclosure combines preoperative data to design a checking guide plate, the checking guide plate is provided with indicator rods 2 of axial direction and depth direction, which can perform real-time checking of the axial direction position of the implant entry, when the implant is parallel to two indicator rods 2, the implant with no offset in the axial direction is checked out, and the upper surface position of the indicator rod is the depth of the drill needle entry, so as to realize the implantation axial direction and depth checking of the implant.

In one or more examples, the specific steps described in step S1 comprise: using an intraoral scanner, or using a model scanner after making an impression and pouring a gypsum cast model to obtain the dentition data of the patient, importing the model data into professional dental design software for virtual tooth arrangement, taking Cone Beam Computed Tomography to obtain the jaw data.

In one or more examples, the specific steps described in step S2 comprise: importing the jaw data, the preoperative model data and the virtual waxing data into the implant planning software, superimposing the preoperative model, the virtual waxing and the jaw data, selecting the implant of the proper type and size according to clinical needs, and adjusting the three-dimensional position of the implant after combining the virtual waxing and jaw data.

In one or more examples, the specific steps described in step S3 comprise: customizing a cylindrical abutment in the advanced mode with a diameter of 2.5 mm and a length of adding 1 mm on the basis of the deviation obtained in step S2, exporting the abutment and model STL data, the model and the abutment data are in the same coordinate system.

In one or more examples, the specific steps described in step S4 comprise: selecting the abutment to fit a cylinder feature C1, copying the cylinder feature C1 to the global coordinate system, taking the long axis of the cylinder as the rotation axis, translating the abutment with advanced move mode, fitting a cylindrical feature C2 after translation again, copying the feature C2 to the global coordinate system, selecting the centers of a base face of the two cylindrical features to create the feature plane P1, wherein the feature plane P1 bisects the cylindrical features C1 and C2, selecting two centers of the upper base faces or those of the lower base faces of the two cylindrical features to create the feature line L1, passing through the center of the upper base face of the cylindrical features C1, creating a feature plane P2 perpendicular to the feature line L1, wherein the feature plane P2 bisects the cylindrical feature C1, deviating 10 mm to the labial/buccal side to form the feature plane P3, and 10 mm to the lingual/palatal side to form a feature plane P4 based on P2, forming a labial/buccal side feature line L2 by intersection of the feature plane P1 and the feature plane P3, forming a lingual/palatal side feature line L3 by intersection of the feature plane P1 and the feature plane P4, forming a feature point D1 by intersection of L2 and L 1 at the labial/buccal side, forming a feature point D2 by intersection of L3 and L1 at the lingual/palatal side; taking point D1 as the base point and line L2 as the axis to create a feature cylinder C3 with a diameter of 2.5 mm and a height of 15 mm at the labial/buccal side, taking point D2 as the base point and line L3 as the axis to create a feature cylinder C4 with a diameter of 2.5 mm and a height of 15 mm at the lingual/palatal side, and converting the feature cylinders C3 and C4 into polygonal objects, that is, the polygonal objects corresponding to C3 and C4 are the prototypes of the axial direction and depth indicator rods 2 at the labial/buccal side and the lingual/palatal side.

In one or more examples, in step S4, after constructing the offset cylindrical features, the offset cylindrical features are converted to the polygon.

The step S4 can be completed in the industrial software Geomagic Studio.

In one or more examples, the specific steps described in step S5 comprise: constructing the sketch of a circle, and then with the center of the circle as the center, constructing a square with a side length smaller than the diameter of the circle, wherein the side length is 0.1-0.4 mm smaller than the diameter of the circle, stretching the two-dimensional sketch to obtain a cuboid, and exporting the data, fitting the data to the prototype of the labial/buccal side and lingual/palatal side indicator rod 2 obtained in step S4 respectively, and then copying the cylindrical features C3 and C4 into the angular indicator rod 2, taking the long axis of the cylindrical features as the rotation axis, making the seamed edge of the labial/buccal side indicator rod 2 coincide with the feature plane P3, and the seamed edge of the lingual/palatal side indicator rod 2 coincide with the feature plane P4, completing the design of the angular indicator rods 2 of the labial/buccal side and lingual/palatal side.

The present disclosure converts the cylindrical prototype indicator rod into the angular indicator rod, so that the operator can observe whether the axial direction of the implant drill is parallel to the indicator rod.

The step S5 can be modeled in the industrial forward design software Solidworks, and the angular three-dimensional figure can be fitted to the prototype of the cylindrical indicator rod by "manual registration" and "global registration" in the industrial software Geomagic Studio.

In one or more examples, the specific steps described in step S6 comprise: designing the occlusal plate 1 based on the model after fitting of the dentition data and the jaw data, setting a connecting rod 3 to connect the indicator rods 2 at the labial/buccal side and the lingual/palatal side, completing the axial direction and depth checking guide plate, and using 3D printing technology to complete the printing of the guide plate.

Example 2

Figure 9:
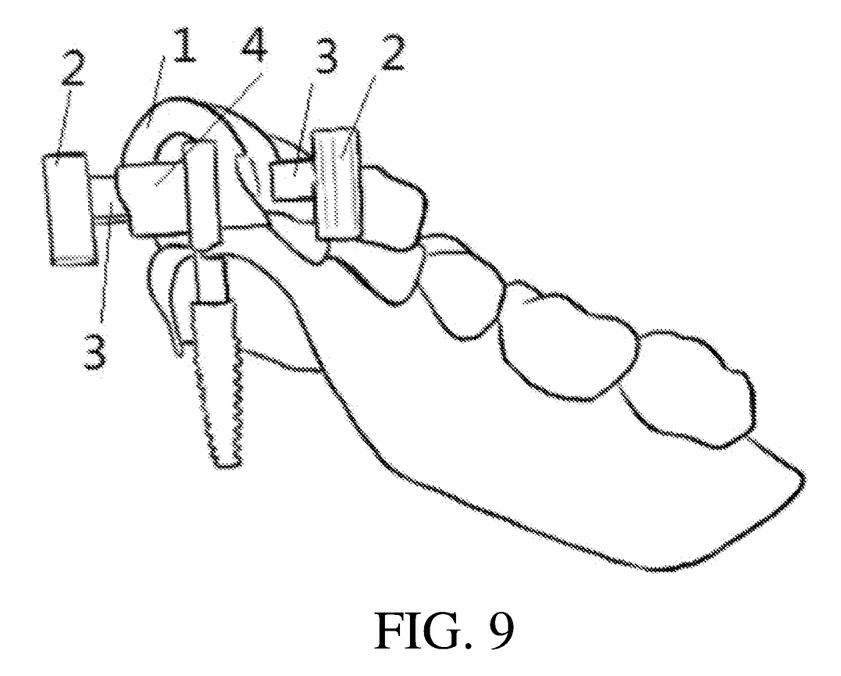
FIG. 9 is a three-dimensional structure schematic diagram of the axial and depth checking guide plate of the present disclosure.

As shown in FIGS. 7 to 9, an axial direction and depth checking guide plate for implanting, comprise the indicator rods 2, the connecting rod 3 and the occlusal plate 1, wherein the connecting rod 3 is connected to the indicator rods 2 and the occlusal plate 1.

The indicator rod 2 is provided with 4 corner angles, and a camber is arranged between two adjacent corner angles.

The occlusal plate 1 is provided with a clamping groove 4, and the clamping groove 4 is connected with the tooth.

The above examples further elaborate on the object, technical solution and beneficial effects of the present disclosure, it should be understood that the above examples are only specific examples of the present disclosure, and are not used to limit the scope of protection of the present disclosure. Any modification, equivalent replacement, improvement, etc. made within the spirit and principles of the present disclosure should be included in the scope of protection of the present disclosure.

What is claimed is:

1. A manufacture method of axial direction and depth checking guide plate for implanting, comprising the following steps:
    S1: obtaining dentition data by means of an optical scanner, obtaining a preoperative model according to the dentition data; obtaining a virtual tooth arrangement according to the dentition data, obtaining a virtual waxing according to the virtual tooth arrangement; taking oral Cone Beam Computed Tomography to obtain jaw data;
    S2: determining type and size of an implant after matching the preoperative model, the virtual waxing and the jaw data, adjusting the three-dimensional position of the implant according to the virtual waxing and the jaw;
    S3: customizing an abutment according to the three-dimensional position of the implant in step S2, and obtaining abutment data and model data after fitting of the dentition data and the jaw data;
    S4: constructing cylindrical features for the abutment according to the data obtained in step S3, shifting to a labial/buccal side and a lingual/palatal side respectively, constructing the cylindrical features again, obtaining the prototype of an indicator rod;
    S5: creating the indicator rod according to the prototype obtained in step S4, and fitting it with the labial/buccal and lingual/palatal prototype separately to obtain the definitive indicator rod data;
    S6: designing an occlusal plate according to the model data after fitting of the dentition data and the jaw data, and connecting it with the indicator rod, completing the design of the axial direction and depth checking guide plate, and using 3D printing technology to complete the manufacturing.

2. The manufacture method of axial direction and depth checking guide plate for implanting according to claim 1, wherein, the specific steps described in step S1 comprise:
    using an intraoral scanner, or using a model scanner after making an impression and pouring a gypsum cast model to obtain dentition data of the patient, importing the model data into professional dental design software for virtual tooth arrangement, taking Cone Beam Computed Tomography to obtain the jaw data.

3. The manufacture method of axial direction and depth checking guide plate for implanting according to claim 2, wherein, the specific steps described in step S2 comprise:
    importing the jaw data, the preoperative model data and the virtual waxing data into the implant planning software, superimposing the preoperative model, the virtual waxing and the jaw data, selecting the implant of the proper type and size according to clinical needs, and adjusting the three-dimensional position of the implant by combining the virtual waxing and jaw data.

4. The manufacture method of axial direction and depth checking guide plate for implanting according to claim 2, wherein, in step S4, after constructing the offset cylindrical features, the offset cylindrical features are converted to a polygon.

5. The manufacture method of axial direction and depth checking guide plate for implanting according to claim 2, wherein, the specific steps described in step S5 comprise:
    constructing the sketch of a circle, and then with the center of the circle as the center, constructing a square with a side length smaller than the diameter of the circle, stretching the two-dimensional sketch to obtain a cuboid, and exporting the data, fitting the data to the prototype of the labial/buccal side and lingual/palatal side indicator rod obtained in step S4 respectively, and then copying the cylindrical features C3 and C4 into the angular indicator rod, taking long axis of the cylindrical features as the rotation axis, making the seamed edge of the labial/buccal side indicator rod coincide with a feature plane P3, and the seamed edge of the lingual/palatal side indicator rod coincide with a feature plane P4, completing design of the angular indicator rods of the labial/buccal side and lingual/palatal side.

6. The manufacture method of axial direction and depth checking guide plate for implanting according to claim 2, wherein, the specific steps described in step S4 comprise:

selecting the abutment to fit cylinder feature C1, copying the cylinder feature C1 to a global coordinate system, taking the long axis of the cylinder as the rotation axis, translating the abutment with advanced move mode, fitting a cylindrical feature C2 after translation again, copying the feature C2 to the global coordinate system, selecting the centers of a base face of the two cylindrical features to create a feature plane P1, wherein the feature plane P1 bisects the cylindrical features C1 and C2, selecting two centers of the upper base faces or those of the lower base faces of the two cylindrical features to create a feature line L1, passing through the center of the upper base face of the cylindrical features C1, creating a feature plane P2 perpendicular to the feature line L1, wherein the feature plane P2 bisects the cylindrical feature C1, deviating 10 mm to the labial/buccal side to form a feature plane P3, and 10 mm to the lingual/palatal side to form a feature plane P4 based on P2, forming a labial/buccal side feature line L2 by intersection of the feature plane P1 and the feature plane P3, forming a lingual/palatal side feature line L3 by intersection of the feature plane P1 and the feature plane P4, forming a feature point D1 by intersection of L2 and L1 at the labial/buccal side, forming a feature point D2 by intersection of L3 and L1 at the lingual/palatal side; taking point D1 as the base point and line L2 as the axis to create a feature cylinder C3 with a diameter of 2.5 mm and a height of 15 mm at the labial/buccal side, taking point D2 as the base point and line L3 as the axis to create a feature cylinder C4 with a diameter of 2.5 mm and a height of 15 mm at the lingual/palatal side, and converting the feature cylinders C3 and C4 into polygonal objects, that is, the polygonal objects corresponding to C3 and C4 are the prototypes of the axial direction and depth indicator rods at the labial/buccal side and the lingual/palatal side.

7. The manufacture method of axial direction and depth checking guide plate for implanting according to claim 2, wherein, the specific steps described in step S6 comprise:
designing the occlusal plate based on the model after superimposition of the dentition data and the jaw data, setting a connecting rod to connect the angular indicator rods of the labial/buccal side and the lingual/palatal side, completing the axial direction and depth checking guide plate, and using 3D printing technology to complete the printing of the guide plate.

8. An axial direction and depth checking guide plate for implanting, wherein, the guide plate is made by the manufacture method according to claim 2, and comprise the indicator rods, the connecting rod and the occlusal plate, wherein the connecting rod is connected to the indicator rods and the occlusal plate.

9. The axial direction and depth checking guide plate for implanting according to claim 8, wherein, the indicator rods are provided with 4 corner angles, and a camber is arranged between two adjacent corner angles.

10. The axial direction and depth checking guide plate for implanting according to claim 9, wherein, the occlusal plate is provided with a clamping groove, and the clamping groove is connected with the tooth.

11. The axial direction and depth checking guide plate for implanting according to claim 8, wherein, the occlusal plate is provided with a clamping groove, and the clamping groove is connected with the tooth.

12. The manufacture method of axial direction and depth checking guide plate for implanting according to claim 1, wherein, the specific steps described in step S2 comprise:
importing the jaw data, the preoperative model data and the virtual waxing data into the implant planning software, superimposing the preoperative model, the virtual waxing and the jaw data, selecting the implant of the proper type and size according to clinical needs, and adjusting the three-dimensional position of the implant after combining the virtual waxing and jaw data.

13. The manufacture method of axial direction and depth checking guide plate for implanting according to claim 1, wherein, in step S4, after constructing the offset cylindrical features, the offset cylindrical features are converted to a polygon.

14. The manufacture method of axial direction and depth checking guide plate for implanting according to claim 1, characterized in that, the specific steps described in step S5 comprise:
constructing sketch of a circle, and then with the center of the circle as the center, constructing a quadrilateral with a side length smaller than the diameter of the circle, stretching the two-dimensional sketch to obtain cuboid, and exporting the data, fitting the data to the prototype of the labial/buccal side and lingual/palatal side indicator rod obtained in step S4 respectively, and then copying the cylindrical features C3 and C4 into the angular indicator rod, taking long axis of the cylindrical features as the rotation axis, making the seamed edge of the labial/buccal side indicator rod to coincide with a feature plane P3, and rotating corner angle of the lingual/palatal side indicator rod to coincide with a feature plane P4, completing design of the angular indicator rods of the labial/buccal side and lingual/palatal side.

15. The manufacture method of axial direction and depth checking guide plate for implanting according to claim 1, wherein, the specific steps described in step S4 comprise:
selecting the abutment to fit cylinder feature C1, copying the cylinder feature C1 to a global coordinate system, taking the long axis of the cylinder as the rotation axis, translating the abutment with advanced object mover mode, fitting a cylindrical feature C2 after translation again, copying the feature C2 to the global coordinate system, selecting the centers of base face of the two cylindrical features to create a feature plane P1, wherein the feature plane P1 bisects the cylindrical features C1 and C2, selecting two centers of the upper base face or those of the lower base face of the two cylindrical features to create a feature line L1, passing through the center of the upper base face of the cylindrical features C1, creating a feature plane P2 perpendicular to the feature line L1, wherein the feature plane P2 bisects the cylindrical feature C1, deviating 10 mm to the labial/buccal side to form a feature plane P3, and 10 mm to the lingual/palatal side to form a feature plane P4 based on P2, forming a labial/buccal side feature line L2 by intersection of the feature plane P1 and the feature plane P3, forming a lingual/palatal side feature line L3 by intersection of the feature plane P1 and the feature plane P4, forming a feature point D1 by intersection of L2 and L1 at the labial/buccal side, forming a feature point D2 by intersection of L3 and L1 at the lingual/palatal side; taking point D1 as the base point and line L2 as the axis to create a feature cylinder C3 with a diameter of 2.5 mm and a height of 15 mm at the labial/buccal side, taking point D2 as the base point and line L3 as the axis to create a feature cylinder C4 with a diameter of 2.5 mm and a height of 15 mm at the lingual/palatal side, and converting the feature cylinders C3 and C4 into polygonal objects, that is, the polygonal objects corresponding to C3 and C4 are the prototypes of the axial direction and depth indicator rods at the labial/buccal side and the lingual/palatal side.

16. The manufacture method of axial direction and depth checking guide plate for implanting according to claim 1, wherein in that, the specific steps described in step S6 comprise:

designing the occlusal plate based on the model after fitting of the dentition data and the jaw data, setting a connecting rod to connect the indicator rods of the labial/buccal side and the lingual/palatal side, completing the axial direction and depth checking guide plate, and using 3D printing technology to complete the printing of the guide plate.

17. An axial direction and depth checking guide plate for implanting, wherein, the guide plate is made by the manufacture method according to claim 1, and comprise the indicator rods, the connecting rod and the occlusal plate, wherein the connecting rod is connected to the indicator rods and the occlusal plate.

18. The axial direction and depth checking guide plate for implanting according to claim 17, wherein, the indicator rods are provided with 4 corner angles, and a camber is arranged between the corner angles.

19. The axial direction and depth checking guide plate for implanting according to claim 18, wherein, the occlusal plate is provided with a clamping groove, and the clamping groove is connected with the tooth.

20. The axial direction and depth checking guide plate for implanting according to claim 17, characterized in that, the occlusal plate is provided with a clamping groove, and the clamping groove is connected with the tooth.

* * * * *